US012238836B2

(12) United States Patent
Wu et al.

(10) Patent No.: US 12,238,836 B2
(45) Date of Patent: Feb. 25, 2025

(54) LIGHTING APPARATUS

(71) Applicant: LEEDARSON LIGHTING CO., LTD., Fujian (CN)

(72) Inventors: Yongqiang Wu, Fujian (CN); Yangbin Xu, Fujian (CN); Guiyuan Lin, Fujian (CN); Hemu Ye, Fujian (CN); Qiqiang Lin, Fujian (CN); Yankun Li, Fujian (CN); Zongyuan Liu, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 298 days.

(21) Appl. No.: 17/861,898

(22) Filed: Jul. 11, 2022

(65) Prior Publication Data

US 2023/0010921 A1 Jan. 12, 2023

(30) Foreign Application Priority Data

Jul. 9, 2021 (CN) ......................... 202121565499.2
Aug. 6, 2021 (CN) ......................... 202121828887.5

(51) Int. Cl.
*H05B 45/3725* (2020.01)
*H05B 45/28* (2020.01)
*H05B 45/325* (2020.01)

(52) U.S. Cl.
CPC ......... *H05B 45/3725* (2020.01); *H05B 45/28* (2020.01); *H05B 45/325* (2020.01)

(58) Field of Classification Search
None
See application file for complete search history.

(56) References Cited

U.S. PATENT DOCUMENTS

2013/0229124 A1* 9/2013 Livschitz ............... H05B 47/10 315/201
2013/0293151 A1* 11/2013 Puvanakijjakorn .. H05B 45/385 315/297
2014/0042933 A1* 2/2014 Livschitz ............... H05B 45/14 315/307
2014/0070710 A1* 3/2014 Harris .................. H05B 45/375 315/185 R
2015/0237700 A1* 8/2015 Woytowitz ......... H05B 47/1965 315/307
2018/0077783 A1* 3/2018 Sooch .................... H05B 45/28
2019/0104583 A1* 4/2019 Konishi ............... H05B 45/382
2019/0215927 A1* 7/2019 Sooch .................... H05B 47/16
2019/0313503 A1* 10/2019 Woytowitz ............. H05B 45/20
2020/0224857 A1* 7/2020 Liang ...................... F21V 14/06
2021/0068227 A1* 3/2021 Mai ........................ H05B 45/31
2021/0305978 A1* 9/2021 Chen ...................... H05B 45/37
2021/0352791 A1* 11/2021 Tham .................... F21S 10/005

* cited by examiner

*Primary Examiner* — Wilson Lee
(74) *Attorney, Agent, or Firm* — Chun-Ming Shih; LANWAY IPR SERVICES

(57) ABSTRACT

A lighting apparatus includes a bridge circuit, a current source, a first LED module, a second LED module and a switch. The bridge circuit is used for rectifying an input AC power to generate a DC power. The current source receives the DC power to generate a driving current. The first LED module emits a first light of a first color temperature. The second LED module emits a second light of a second color temperature. The switch is coupled to the current source to change at least a resistance parameter corresponding to a current ratio between the first LED module and the second LED module to generate a mixed light of a mixed color temperature.

19 Claims, 14 Drawing Sheets

LIGHTING APPARATUS

FIELD

The present invention is related to a lighting apparatus, and more particularly related to a lighting apparatus with a flexible driver circuit.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

More and more light devices are deployed in various environments. It is important to provide a cost effective solution with flexible control.

In addition, it is helpful if both color temperature and light intensity may be adjusted with such flexible solution. More and more light devices are deployed in various environments. It is important to provide a cost effective solution with flexible control.

In addition, it is helpful if both color temperature and light intensity may be adjusted with such flexible solution. More and more light devices are deployed in various environments. It is important to provide a cost effective solution with flexible control.

SUMMARY

In some embodiments, a lighting apparatus includes a bridge circuit, a current source, a first LED module, a second LED module and a switch.

The bridge circuit is used for rectifying an input AC power to generate a DC power.

The current source receives the DC power to generate a driving current.

The first LED module emits a first light of a first color temperature.

The second LED module emits a second light of a second color temperature.

The switch is coupled to the current source to change at least a resistance parameter corresponding to a current ratio between the first LED module and the second LED module to generate a mixed light of a mixed color temperature.

In some embodiments, the lighting apparatus may also include a first resistor module and a second resistor module.

The first resistor module is coupled to the current source for generating a first PWM signal and a second PWM signal respectively for the first LED module and the second LED module.

The second resistor module is coupled to the current source for adjusting a current level of the driving current.

In some embodiments, the lighting apparatus may also include a first transistor and a second transistor.

The first LED module is coupled to the first transistor.

The first transistor is controlled by the first PWM signal to determine when to guide the driving current to the first LED module.

The second LED module is coupled to the second transistor.

The second transistor is controlled by the second PWM signal to determine when to guide the driving current to the second LED module.

In some embodiments, the first resistor module includes a first manual switch and multiple first resistors.

The first manual switch is used for a user to select one from the multiple first resistors to couple to the current source.

In some embodiments, the first resistor module includes more than five first resistors for the user to select one among more than five options.

In some embodiments, the driving current is dispatched to the first LED module and the second LED module alternatively.

In some embodiments, the first PWM signal corresponds to a first duty ratio.

The second PWM signal corresponds to a second duty ratio.

The first duty ratio and the second duty ratio determines the mixed color temperature.

In some embodiments, the lighting apparatus may also include a third LED module.

The third LED module is supplied with a background driving current.

The background driving current is kept unchanged as a background light to be mixed with the mixed light rendered by the first LED module and the second LED module.

In some embodiments, the lighting apparatus may also include a third LED module.

The current source generates a third PWM signal.

The third LED module emits a third light with a third color temperature.

The mixed color temperature is corresponding to the first PWM signal, the second PWM signal and the third PWM signal.

In some embodiments, the second resistor module includes a second manual switch and multiple second resistors.

The second manual switch is used for a user to select one from the multiple second resistors to couple to the current source to change a light intensity of the mixed light.

In some embodiments, the first LED module, the second LED module and the current source are mounted on a single circuit board.

In some embodiments, the lighting apparatus may also include a bleeder resistor coupled to the current source for discharging an electric charge stored in a filter capacitor of the current source.

In some embodiments, a TRIAC switch is coupled to the bridge circuit for controlling a conductive angle for changing a light intensity of the mixed light.

In some embodiments, the current source changes the driving current according to the conductive angle of the light intensity.

In some embodiments, mixed color temperature is adjusted when the light intensity of the mixed light is adjusted.

In some embodiments, the first LED module is series connected to a first transistor and a third resistor module.

The second LED module is coupled to a second transistor and a fourth resistor module.

A resistance ratio between the third resistor module and the fourth resistor module determines the mixed color temperature.

In some embodiments, a reference resistor is coupled between the control gates of the first transistor and the second transistor and a driving voltage end.

In some embodiments, a Zenith diode is coupled between the control gates of the first transistor and the second transistor and a ground end.

In some embodiments, a base resistor is coupled between the control gates of the first transistor and the second transistor and a ground end.

In some embodiments, a first amplifier is coupled to the third resistor.

A second amplifier is coupled to the fourth resistor.

DETAILED DESCRIPTION

Figure 12:
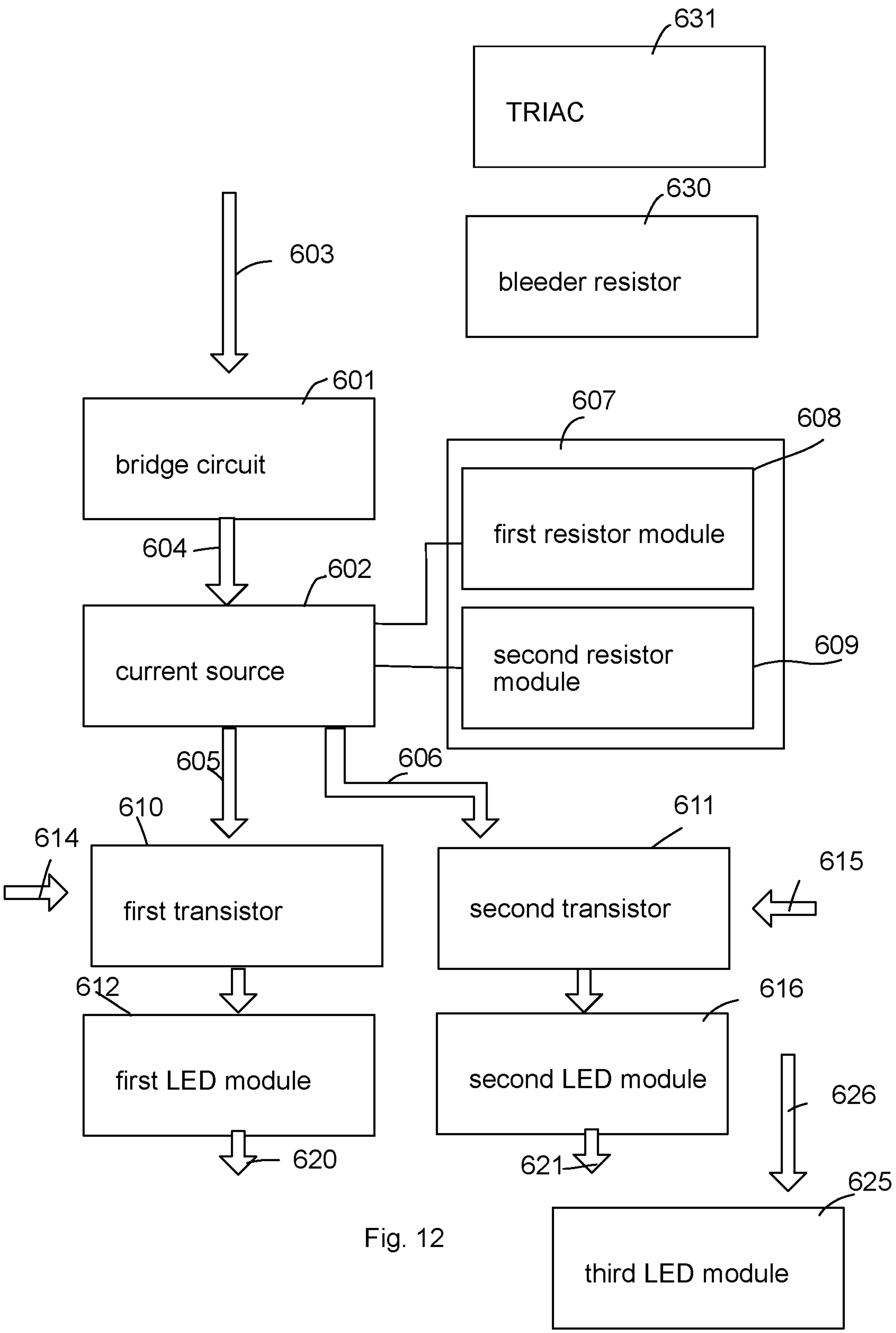
FIG. 12 illustrates a lighting apparatus structure.

In FIG. 12, a lighting apparatus includes a bridge circuit 601, a current source 602, a first LED module 612, a second LED module 616 and a switch 607.

The lighting apparatus may further have a housing to mount these components. The housing may have various shapes and sizes. For example, the housing with the components may form a light bulb device, a downlight device, a panel light device, a linear light device or other devices.

The bridge circuit 601 is used for rectifying an input AC power 603 to generate a DC power 604.

The current source 602 receives the DC power 604 to generate a driving current. In some embodiments, the driving current is divided into a first driving current 605 and a second driving current 606 respectively supplied to the first transistor and the second transistor 611. The current source 602 also generates a first PWM signal 614 and a second PWM signal 615. The first PWM signal 614 and the second PWM signal 615 are used as control signals supplied to the gate terminals of the first transistor 610 and the second transistor 611. When the first PWM signal 615 is at an ON level, e.g. high voltage level, the first driving current 610 is supplied to the first LED module 612 passing through the first transistor 610. When the first PWM signal 615 is at an OFF level, e.g. low voltage level, the first driving current 610 is stopped to supply to the first LED module 612.

The second transistor 611 functions similarly to the first transistor 610. In some embodiments, the first PWM signal 614 and the second PWM signal 615 may be controlled to set as a reverse relation. Specifically, when the first PWM signal 614 is at ON level, the second PWM signal 615 is at OFF level. When the first PWM signal 614 is at OFF level, the second PWM signal 615 is at ON level.

The first LED module 612 emits a first light 620 of a first color temperature.

The second LED module 616 emits a second light 621 of a second color temperature.

The switch 607 is coupled to the current source 602 to change at least a resistance parameter corresponding to a current ratio between the first LED module 612 and the second LED module 616 to generate a mixed light of a mixed color temperature.

In some embodiments, the lighting apparatus may also include a first resistor module 608 and a second resistor module 609.

The first resistor module 608 is coupled to the current source 602 for generating a first PWM signal 614 and a second PWM signal 615 respectively for the first LED module 612 and the second LED module 616.

The second resistor module 609 is coupled to the current source 602 for adjusting a current level of the driving current.

The first resistor module 608 may be operated to change a first resistance. The first resistance is coupled to the current source 602 to adjust the first PWM signal 614 and the second PWM signal 615. For example, the duty ratio of the first PWM 614 may be increased when the first resistance is increased. Meanwhile, the duty ratio of the second PWM 615 may be decreased when the first resistance is increased. In such case, the light intensity of the first LED module 612 is increased while the light intensity of the second LED module 616 is decreased so as to change the mixed color temperature.

In some embodiments, the lighting apparatus may also include a first transistor 610 and a second transistor 611.

The first LED module 612 is coupled to the first transistor 610.

The first transistor 610 is controlled by the first PWM signal 614 to determine when to guide the driving current to the first LED module 612.

The second LED module 616 is coupled to the second transistor 611.

The second transistor 611 is controlled by the second PWM signal 615 to determine when to guide the driving current to the second LED module 616.

In some embodiments, the first resistor module 608 includes a first manual switch and multiple first resistors.

Figure 10:
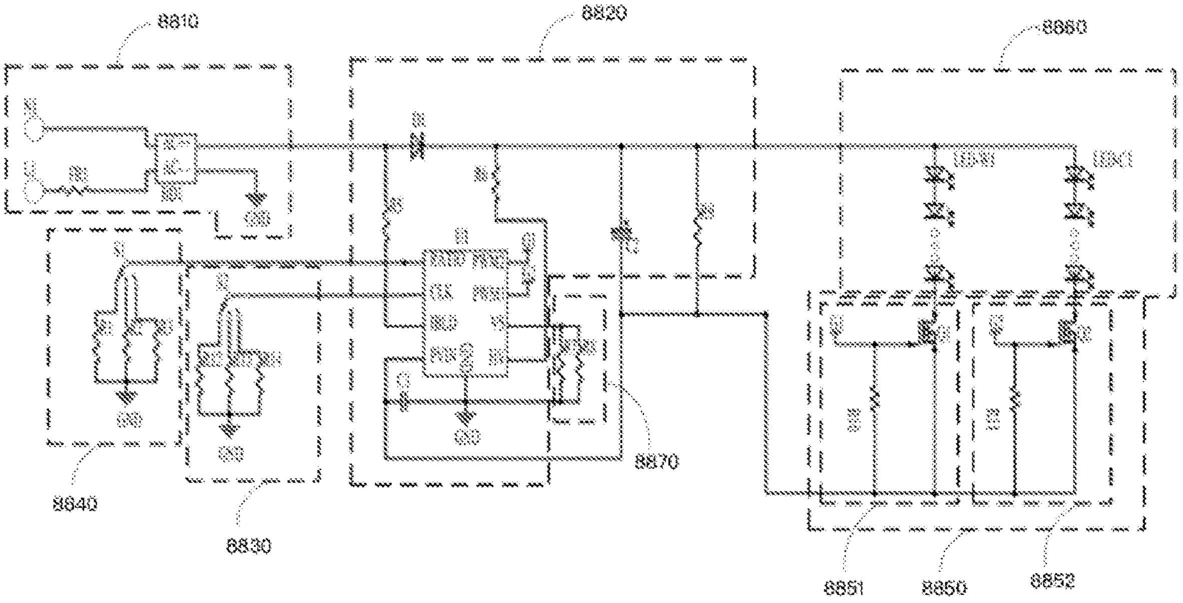
FIG. 10 illustrates a circuit example of a lighting apparatus.

FIG. 10 shows such an example. In FIG. 10, the first resistor module has a switch S1 and three resistors R1, R2, R3.

In FIG. 10, the first manual switch S1 is used for a user to select one from the multiple first resistors R1, R2, R3 to couple to the current source, the power chip U1.

In some embodiments, the first resistor module includes more than five first resistors for the user to select one among more than five options. FIG. 10 shows a three-resistor module, but persons of ordinary skilled in the art would know how to implement five resistor module in view of the example in FIG. 10.

In some embodiments, the driving current is dispatched to the first LED module and the second LED module alternatively. In such case, the overall driving current is kept constant even the color temperature is adjusted by changing the duty ratio relation between the first LED module and the second LED module.

In some embodiments, the first PWM signal corresponds to a first duty ratio.

The second PWM signal corresponds to a second duty ratio.

The first duty ratio and the second duty ratio determines the mixed color temperature.

In FIG. 12, the lighting apparatus may also include a third LED module 625.

The third LED module 625 is supplied with a background driving current 626.

The background driving current 626, which may be generated by the current source 602 or another power source in the lighting apparatus is kept unchanged as a background light to be mixed with the mixed light rendered by the first LED module 612 and the second LED module 616.

In some embodiments, the lighting apparatus may also include a third LED module.

The current source generates a third PWM signal.

The third LED module emits a third light with a third color temperature. Such embodiments are similar to the design mentioned above and their drawings are not illustrated again for brevity.

The current source 602 may adopt various conventional designs. For example, protection circuit, filter circuit and/or other components for generating a stable current output may be selected by persons skilled in the art.

The mixed color temperature is corresponding to the first PWM signal, the second PWM signal and the third PWM signal.

In FIG. 10, the second resistor module includes a second manual switch S2 and multiple second resistors R12, R13, R14.

The second manual switch S2 is used for a user to select one from the multiple second resistors R12, R13, R14 to couple to the current source to change a light intensity of the mixed light.

In other words, the first resistor module is used for changing the color temperature while the second resistor module is used for changing the light intensity.

Figure 13:
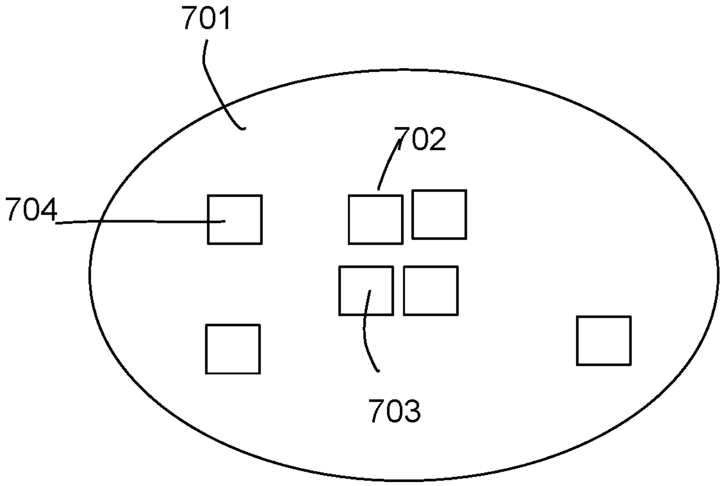
FIG. 13 shows a circuit board mounted with components.

In FIG. 13, the first LED module 702, the second LED module 703 and the current source 704 are mounted on a single circuit board 701.

In FIG. 12, the lighting apparatus may also include a bleeder resistor 630 coupled to the current source 602 for discharging an electric charge stored in a filter capacitor of the current source 602.

In FIG. 12, a TRIAC switch 631, which may be coupled to a wall switch, is coupled to the bridge circuit 601 for controlling a conductive angle for changing a light intensity of the mixed light. The conductive angle is a feature of TRIAC switch 631. Since the TRIAC switch details are known to persons of ordinary skilled in the art, e.g. to use a rotation button to change a conductive angle and thus provide a dimmer function.

In some embodiments, the current source changes the driving current according to the conductive angle of the light intensity.

In some embodiments, mixed color temperature is adjusted when the light intensity of the mixed light is adjusted. In such case, when the light intensity is changed, the color temperature is adjusted with a corresponding relation. Such design may simulate a sunset to noon sun light pattern.

In some embodiments, the first LED module is series connected to a first transistor and a third resistor module.

The second LED module is coupled to a second transistor and a fourth resistor module.

In the example of FIG. 7, the first LED module A1, . . . An is connected in series to the transistor Q1. The transistor Q1 is further connected in series to a third resistor RA.

The second LED module B1, . . . Bn is connected in series to the transistor Q2. The transistor Q2 is further connected in series to a fourth resistor RB.

A resistance ratio between the third resistor module and the fourth resistor module determines the mixed color temperature.

The third resistor module and the fourth resistor module may be adjustable modules that are allowed to change their resistance or may be fixed modules that are not allowed to change.

In FIG. 7, a reference resistor R3 is coupled between the control gates of the first transistor Q1 and the second transistor Q2 and a driving voltage end Vb.

In some embodiments, a Zenith diode ZD1 is coupled between the control gates of the first transistor Q1 and the second transistor Q2 and a ground end 488.

In some embodiments, a base resistor is coupled between the control gates of the first transistor and the second transistor and a ground end.

Figure 6:
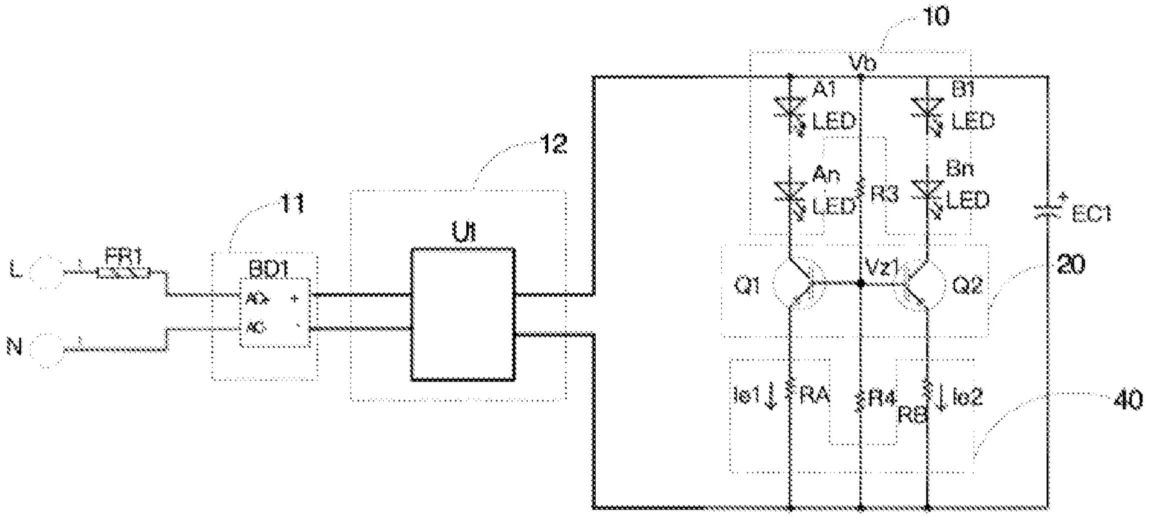
FIG. 6 illustrates another circuit example of a lighting apparatus.

For example, FIG. 6 shows another lighting apparatus example in which the Zenith diode mentioned above is replaced with a base resistor R4.

In some embodiments, a first amplifier is coupled to the third resistor.

A second amplifier is coupled to the fourth resistor.

Figure 1:
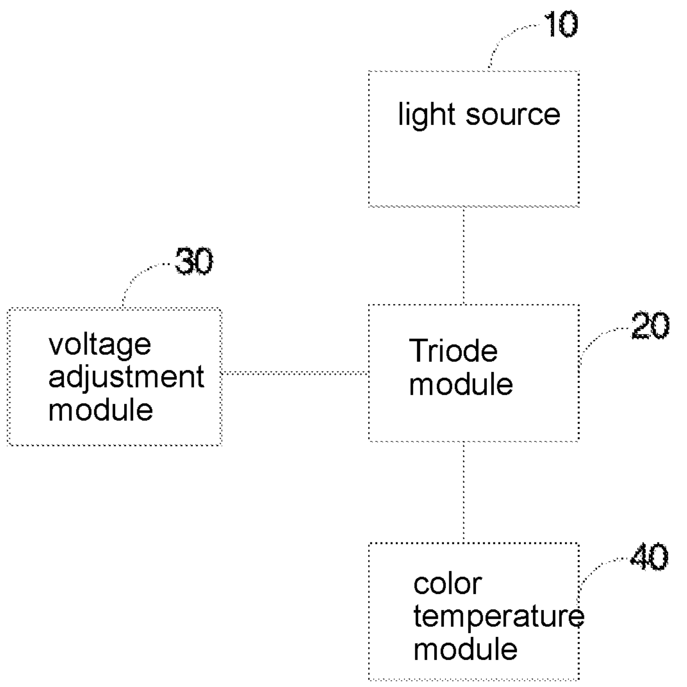
FIG. 1 illustrates a lighting apparatus embodiment.

Please refer to FIG. 1, which shows another lighting apparatus embodiment.

In FIG. 1, the lighting apparatus includes a light source 10, a triode module 20, a voltage adjustment module 30 and a color temperature module 40.

The voltage adjustment module 30 may include the first resistor module and/or the second resistor module to change a voltage supplied to the triode module 20. In addition, the color temperature module 40 may be configured to change a mixed color temperature of the light source 10.

Figure 2:
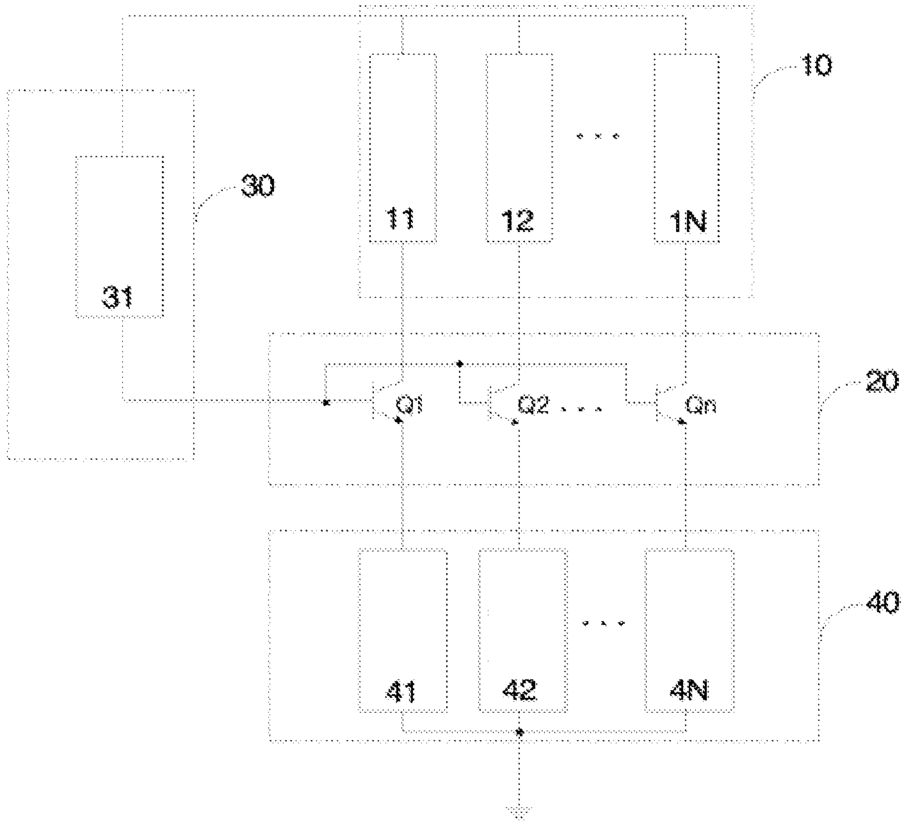
FIG. 2 illustrates a circuit diagram of a lighting apparatus.

FIG. 2 shows a structure diagram of the example in FIG. 1. Same reference numerals refer to the same components in following description.

In FIG. 2, the voltage adjustment module 30 includes a first resistor module 31. There are multiple LED modules 11, 12, . . . , 1N. There are also voltage adjustment units 41, 42, . . . 4N coupled to the LED modules 11, 12, . . . , 1N via multiple resistors Q1, Q2, . . . QN.

Figure 3:
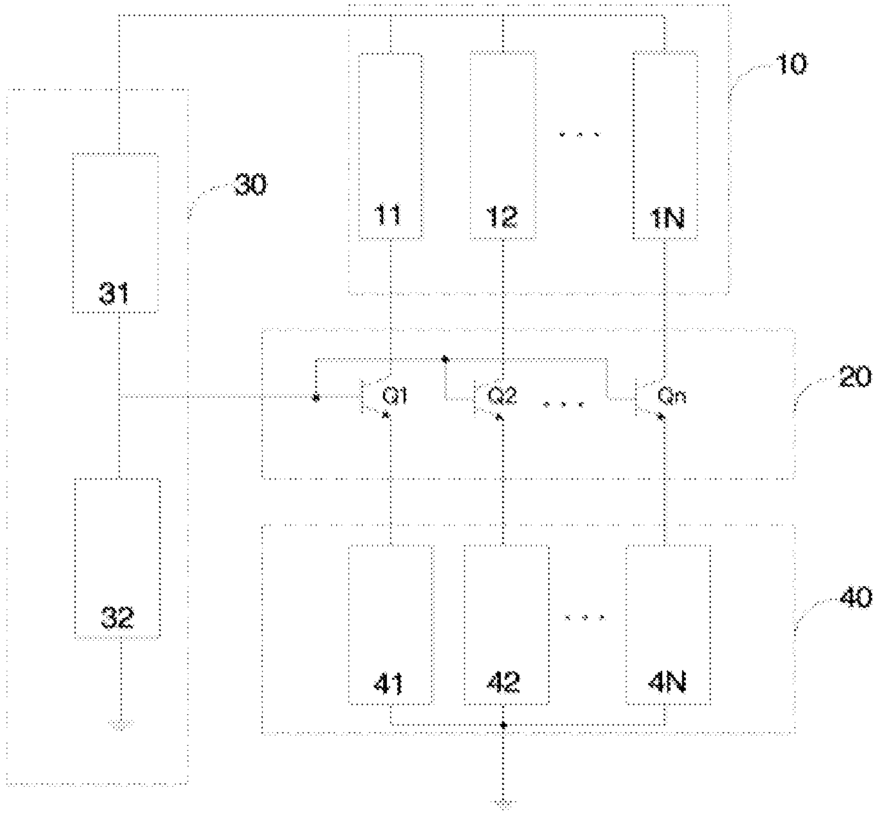
FIG. 3 illustrates another circuit diagram of a lighting apparatus.

FIG. 3 show a similar embodiment like FIG. 2. In addition to the components mentioned in FIG. 2, there is a second resistor module 32.

Figure 4:
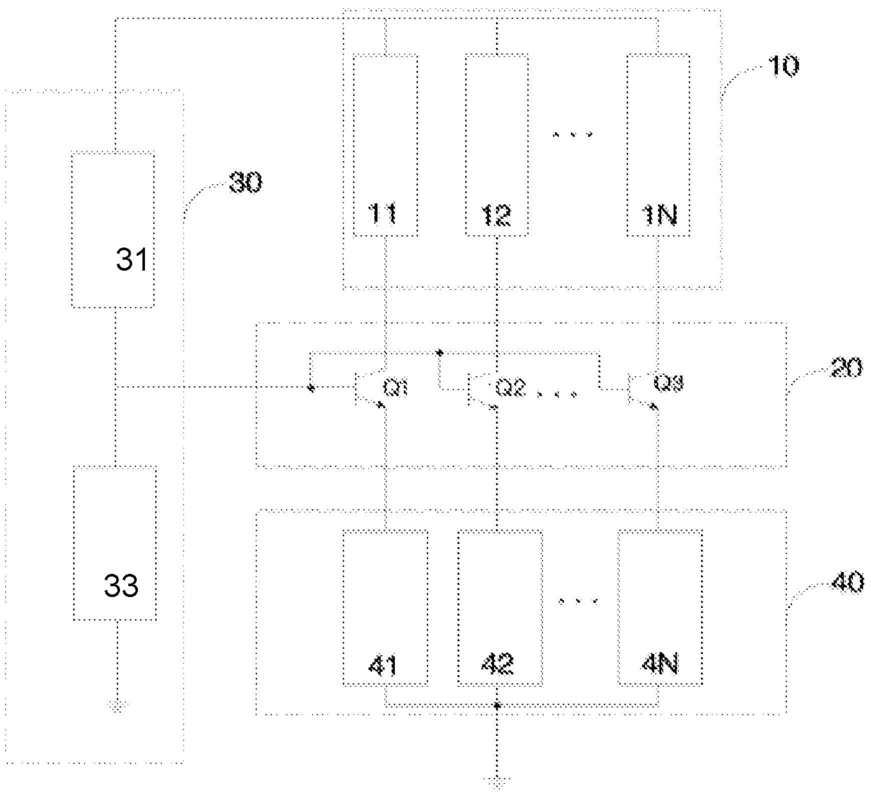
FIG. 4 illustrates another circuit diagram of a lighting apparatus.

FIG. 4 shows a similar embodiment like FIG. 2. In addition to the components mentioned in FIG. 2, there is a Zenith diode 33 disposed to implement a design mentioned above.

Figure 5:
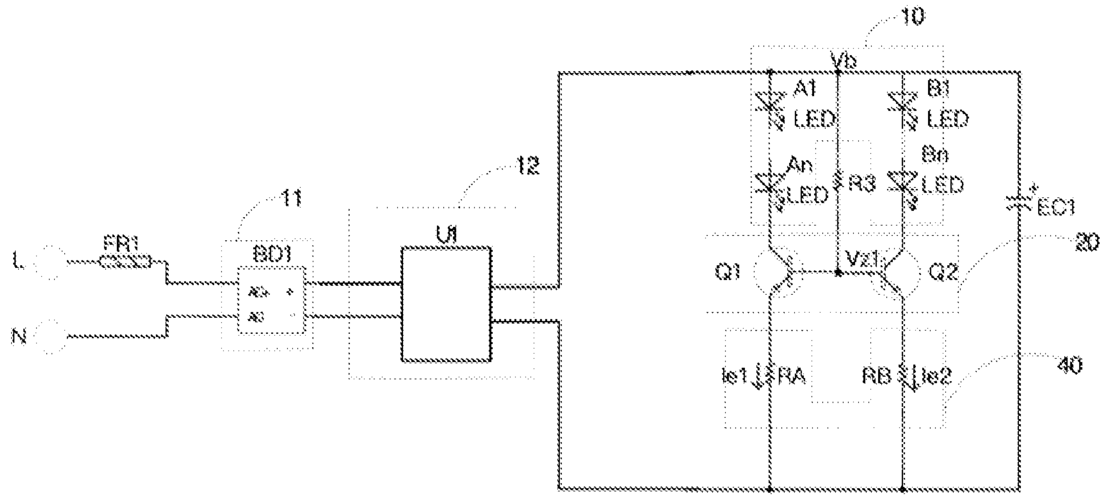
FIG. 5 illustrates a circuit example of a lighting apparatus.

FIG. 5 shows a detailed circuit example for the embodiments mentioned above.

In FIG. 5, an external AC power is supplied via L, N lines passing through a protection unit FR1. There is a switch 11 coupled to a current source 12. The light source 10 includes a series of LED modules A1, . . . An and also includes a series of LED modules B1, . . . Bn. A reference resistor R3 is coupled to the working voltage Vb. Two transistors Q1, Q2 are coupled together with their control gates. A third resistor module RA is coupled to the transistor Q1. A fourth resistor module RB is coupled to the transistor Q2.

FIG. 6 shows a similar example to the example of FIG. 5, except that a resistor R4 is disposed.

Figure 7A:
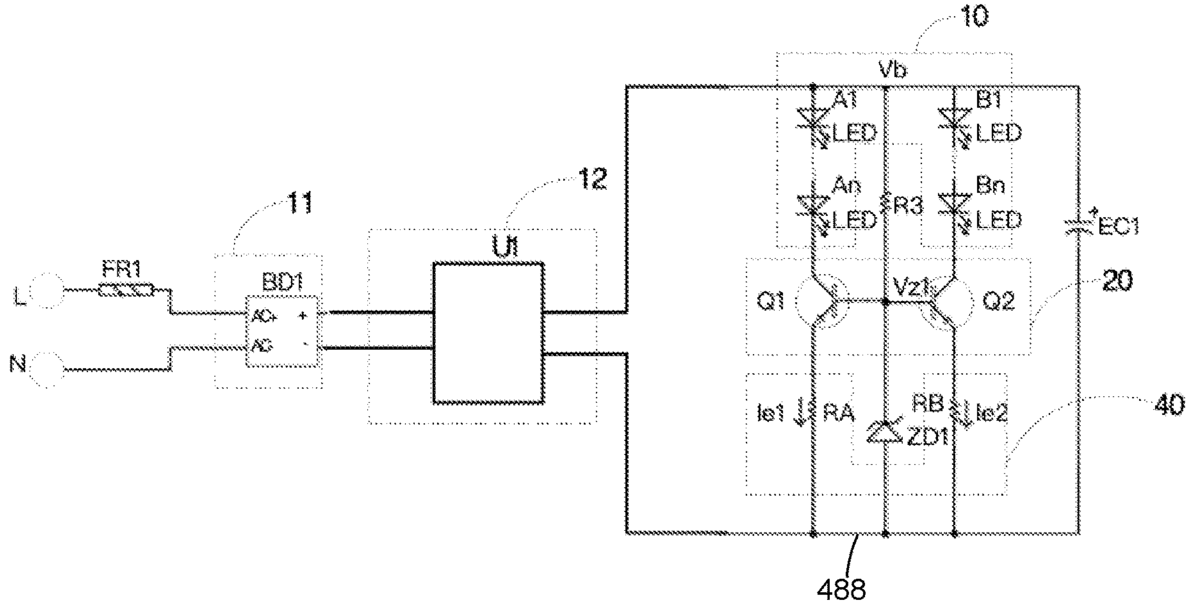
FIG. 7A illustrates another circuit example of a lighting apparatus.

FIG. 7A shows a similar example to the example of FIG. 6, except that the resistor R4 is replaced with a Zenith diode ZD1.

Figure 7B:
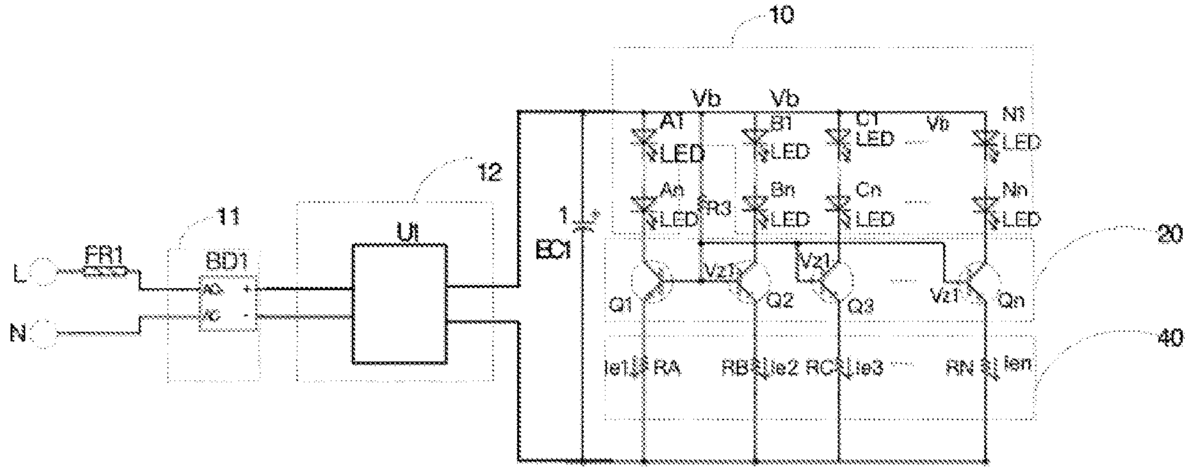
FIG. 7B illustrates another circuit example of a lighting apparatus.

FIG. 7B shows a scaled version of the examples in FIG. 5, FIG. 6 and FIG. 7A.

Figure 8:
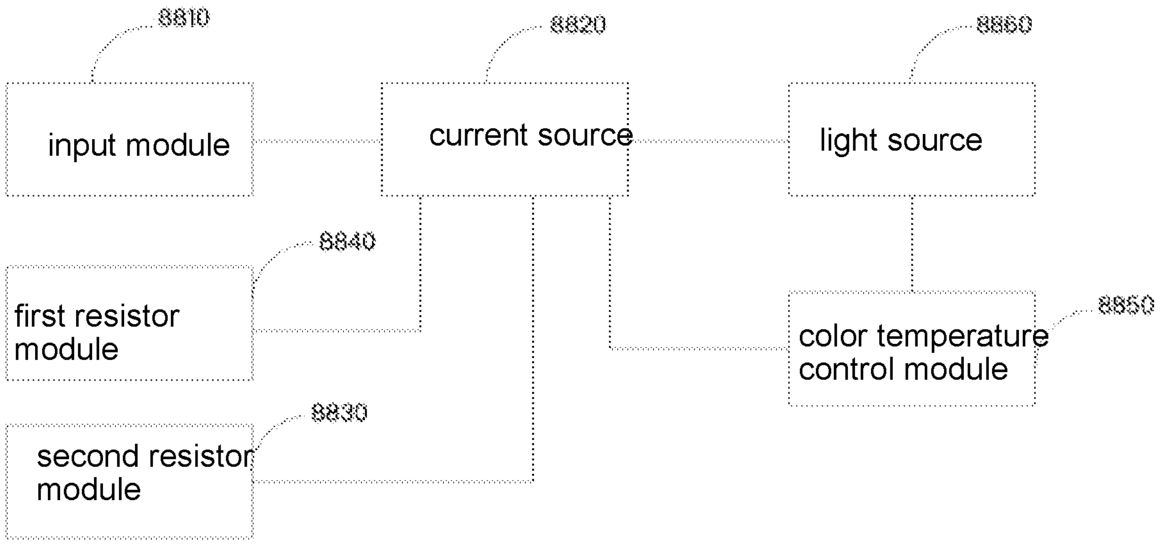
FIG. 8 illustrates another structure diagram of a lighting apparatus.

FIG. 8 shows a lighting apparatus with an input module 8810, a color temperature selection module 8840, a power selection module 8830, a power module 8820, a light source module 8860 and a color temperature control module 8850.

Figure 9:
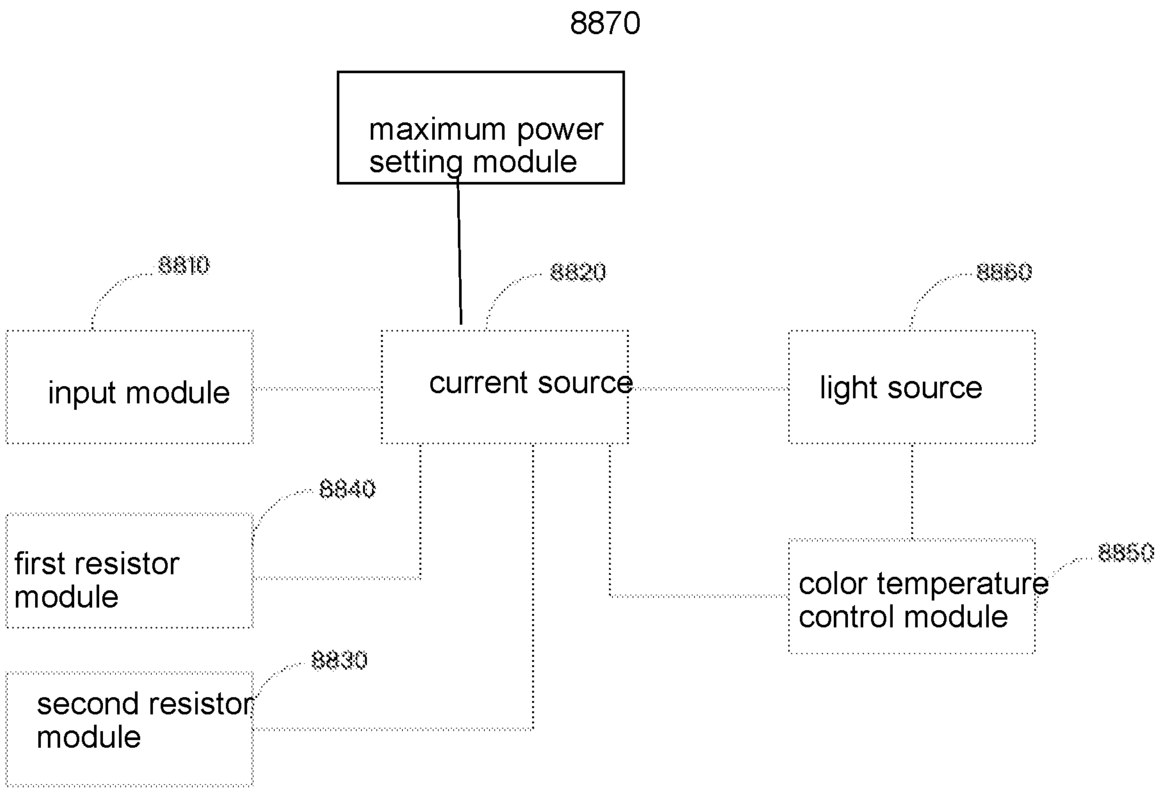
FIG. 9 illustrates another structure diagram of a lighting apparatus.

FIG. 9 shows an example similar to the example in FIG. 8, except a maximum power setting module 8870 is added.

FIG. 10 shows a detailed circuit example. The bridge circuit 8810 converts an AC power to a DC output. The current source 8820 receives resistance from a first resistor module 8840 and a second resistor module 8830. There is a power limiting module 8870 to limit a maximum power output of the current source 8820.

The light source module 8860 includes LED-W1 and LED-C1. The third resistor module 8851 and the fourth resistor module 8852 as an adjusting module 8850.

Figure 11:
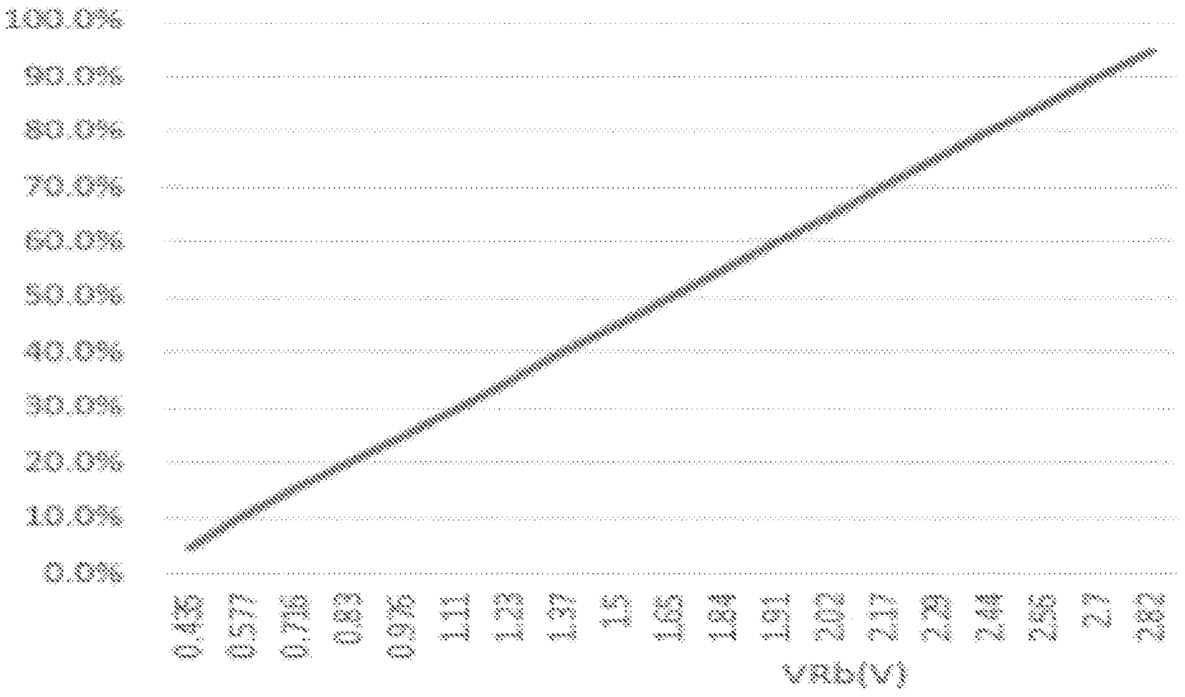
FIG. 11 illustrates a variation relation of output light characteristic.

FIG. 11 shows a relation between a light output and a driving voltage.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a bridge circuit for rectifying an input AC power to generate a DC power;

a current source receiving the DC power to generate a driving current;

a first LED module for emitting a first light of a first color temperature;

a second LED module for emitting a second light of a second color temperature;

a switch coupled to the current source to change at least a resistance parameter corresponding to a current ratio between the first LED module and the second LED module to generate a mixed light of a mixed color temperature; and a first resistor module and a second resistor module, wherein the first resistor module is coupled to the current source for generating a first PWM signal and a second PWM signal respectively for the first LED module and the second LED module, wherein the second resistor module is coupled to the current source for adjusting a current level of the driving current.

2. The lighting apparatus of claim 1, further comprising a first transistor and a second transistor, wherein the first LED module is coupled to the first transistor, wherein the first transistor is controlled by the first PWM signal to determine when to guide the driving current to the first LED module, wherein the second LED module is coupled to the second transistor, wherein the second transistor is controlled by the second PWM signal to determine when to guide the driving current to the second LED module.

3. The lighting apparatus of claim 2, wherein the first resistor module comprises a first manual switch and multiple first resistors, wherein the first manual switch is used for a user to select one from the multiple first resistors to couple to the current source.

4. The lighting apparatus of claim 3, wherein the first resistor module comprises more than five first resistors for the user to select one among more than five options.

5. The lighting apparatus of claim 3, wherein the driving current is dispatched to the first LED module and the second LED module alternatively.

6. The lighting apparatus of claim 5, wherein the first PWM signal corresponds to a first duty ratio, wherein the second PWM signal corresponds to a second duty ratio, wherein the first duty ratio and the second duty ratio determines the mixed color temperature.

7. The lighting apparatus of claim 3, further comprising a third LED module, wherein the third LED module is supplied with a background driving current, wherein the background driving current is kept unchanged as a background light to be mixed with the mixed light rendered by the first LED module and the second LED module.

8. The lighting apparatus of claim 3, further comprising a third LED module, wherein the current source generates a third PWM signal, wherein the third LED module emits a third light with a third color temperature, wherein the mixed color temperature is corresponding to the first PWM signal, the second PWM signal and the third PWM signal.

9. The lighting apparatus of claim 2, wherein the second resistor module comprises a second manual switch and multiple second resistors, wherein the second manual switch is used for a user to select one from the multiple second resistors to couple to the current source to change a light intensity of the mixed light.

10. The lighting apparatus of claim 1, wherein the first LED module, the second LED module and the current source are mounted on a single circuit board.

11. The lighting apparatus of claim 1, further comprising a bleeder resistor coupled to the current source for discharging an electric charge stored in a filter capacitor of the current source.

12. The lighting apparatus of claim 1, wherein a TRIAC switch is coupled to the bridge circuit for controlling a conductive angle for changing a light intensity of the mixed light.

13. The lighting apparatus of claim 12, wherein the current source changes the driving current according to the conductive angle of the light intensity.

14. The lighting apparatus of claim 13, wherein mixed color temperature is adjusted when the light intensity of the mixed light is adjusted.

15. The lighting apparatus of claim 1, wherein the first LED module is series connected to a first transistor and a third resistor module, wherein the second LED module is coupled to a second transistor and a fourth resistor module, wherein a resistance ratio between the third resistor module and the fourth resistor module determines the mixed color temperature.

16. The lighting apparatus of claim 15, wherein a reference resistor is coupled between the control gates of the first transistor and the second transistor and a driving voltage end.

17. The lighting apparatus of claim 16, wherein a Zenith diode is coupled between the control gates of the first transistor and the second transistor and a ground end.

18. The lighting apparatus of claim 16, wherein a base resistor is coupled between the control gates of the first transistor and the second transistor and a ground end.

19. The lighting apparatus of claim 16, wherein a first amplifier is coupled to the third resistor, wherein a second amplifier is coupled to the fourth resistor.

* * * * *